United States Patent
Rao et al.

(10) Patent No.: US 7,814,335 B2
(45) Date of Patent: Oct. 12, 2010

(54) SYSTEM AND METHOD FOR INSTALLING SYSTEM MANUFACTURER PROVIDED SOFTWARE

(75) Inventors: Anil V. Rao, Austin, TX (US); Wayne R. Weilnau, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 778 days.

(21) Appl. No.: 11/768,038

(22) Filed: Jun. 25, 2007

(65) Prior Publication Data

US 2007/0277029 A1   Nov. 29, 2007

Related U.S. Application Data

(63) Continuation of application No. 09/271,581, filed on Mar. 18, 1999, now abandoned.

(51) Int. Cl.
*G06F 12/14* (2006.01)
(52) U.S. Cl. ..................................................... 713/191
(58) Field of Classification Search ........................ None
See application file for complete search history.

(56) References Cited

U.S. PATENT DOCUMENTS

| | | | |
|---|---|---|---|
| 4,926,476 A | 5/1990 | Covey | 380/4 |
| 5,034,980 A | 7/1991 | Kubota | 713/189 |
| 5,675,771 A | 10/1997 | Curley et al. | 395/500 |
| 5,684,875 A | 11/1997 | Ellenberger | 482/4 |
| 5,694,582 A | 12/1997 | Pearce | 395/500 |
| 5,748,877 A | 5/1998 | Dollahite et al. | 714/36 |
| 5,757,907 A | 5/1998 | Cooper et al. | 380/277 |
| 6,134,324 A | 10/2000 | Bohannon et al. | 705/52 |
| 6,259,449 B1 | 7/2001 | Saxena et al. | 345/853 |
| 6,363,497 B1 | 3/2002 | Chrabaszcz | 714/13 |
| 6,389,541 B1 | 5/2002 | Patterson | 705/53 |

*Primary Examiner*—Benjamin E Lanier
(74) *Attorney, Agent, or Firm*—Hamilton & Terrile, LLP; Stephen A. Terrile

(57) ABSTRACT

A system and method of selectively installing software onto a computer system which includes reading a configuration file that contains computer system information, determining an encryption key from data contained in the configuration file, and deciphering data stored on a nonvolatile storage device using the encryption key. The computer system information includes system specific information that may be used to determine whether the computer system was purchased from a particular vendor. In a Windows™ based application, the configuration file includes a BIOS/DOS file that includes computer system specific information and the encryption key is optionally stored in a registry file to provide for repeated uses of the encryption key if more than one data file are being deciphered. In another embodiment, the data file is stored on a World Wide Web page accessible over a global computer network, such as the Internet, to install and decipher encrypted data files stored on a Web server.

18 Claims, 7 Drawing Sheets

SYSTEM AND METHOD FOR INSTALLING SYSTEM MANUFACTURER PROVIDED SOFTWARE

RELATED APPLICATIONS

This application is a continuation of application Ser. No. 09/271,581, filed Mar. 18, 1999 now abandoned, entitled "System and Method for Installing System Manufacturer Provided Software" and naming Anil V. Rao and Wayne R. Weilnau as inventors, which is hereby incorporated by reference in its entirety

BACKGROUND

1. Field

This field relates to computer software for selectively installing software products.

2. Description of the Related Art

Computer systems in general and International Business Machines (IBM) compatible personal computer systems in particular have attained widespread use for providing computer power to many segments of today's modern society. A personal computer system can usually be defined as a desk top, floor standing, or portable microcomputer that includes a system unit having a system processor and associated volatile and non-volatile memory, a display monitor, a keyboard, one or more diskette drives, a fixed disk storage device and an optional printer. One of the distinguishing characteristics of these systems is the use of a system board to electrically connect these components together. These personal computer systems are information handling systems which are designed primarily to give independent computing power to a single user (or a relatively small group of users in the case of personal computers which serve as computer server systems) and are inexpensively priced for purchase by individuals or small businesses. A personal computer system may also include one or a plurality of I/O devices (i.e. peripheral devices) which are coupled to the system processor and which perform specialized functions. Examples of I/O devices include modems, sound and video devices or specialized communication devices. Mass storage devices such as hard disks, CD-ROM drives and magneto-optical drives are also considered to be peripheral devices. Operating systems have evolved from single user, single task operating systems, such as MS-DOS (for Microsoft Disk Operating System), to single user, multitasking operating systems, such as Microsoft Windows NT™.

Companies that manufacture and sell personal computers strive to provide additional value to customers and differentiate their personal computer products from those of their competitors. One way in which companies customize their personal computer is by improving the BIOS (Basic Input/Output System) and providing device drivers that manage the basic operations of the computer system. Computer manufacturers also endeavor to add additional value to their customers by providing software, either software developed by the manufacturer or off-the-shelf applications that are provided to the customers at significant discounts compared to retail and other customer-oriented points of sale. This software is often pre-loaded on the computer system and provided to the customer at the time of purchase. However, for increased customer satisfaction, manufacturers also provide such software to customers after the computer system has been purchased. This after-sale software is provided on removable media (i.e., CD-ROM, floppy disk, etc.) or provided electronically via the Internet. In order to ensure that after-sale software is only installed on computers sold by the manufacturer, a system and method are needed to verify that the computer is a manufacturer-brand computer, otherwise, the software could be installed on competitors' computers decreasing the additional value provided to the manufacturer's customers. One manufacturer-specific component that may be present on a computer system sold by the manufacturer are customized device drivers loaded on the computer system during fabrication. Another manufacturer-specific component that may be present on a computer sold by the manufacturer is a customized BIOS provided by the manufacturer.

BIOS Use Under MS-DOS

MS-DOS uses BIOS (basic input/output system) to manage many basic operations of the system. During system initialization, or "boot," a check is made of the hardware components before control is passed to a ROM BIOS boot program which typically checks the floppy drive ("drive A") to see if it contains a formatted diskette. If drive A does not contain a formatted diskette, the ROM BIOS checks the fixed disk drive ("drive C") to see if it is formatted. When a formatted disk is found, the ROM BIOS reads two hidden system files found on the disk—an input/output system file (IO.SYS or IBMBIO.COM) and a disk operating system file (MSDOS-.SYS or IBMDOS.COM). The IO.SYS file is loaded into RAM and includes a system initialization routine (SYSINIT) that performs the remaining boot sequence. Part of the boot sequence includes loading MSDOS.SYS into RAM. MSDOS.SYS and the BIOS manage disk files, execute programs, and respond to hardware signals. Further along in the boot sequence, device drivers are loaded to control memory or hardware devices.

Under MS-DOS program files, BIOS, and device drivers cooperate in performing system and hardware functions. Machine specific information is often contained in the BIOS. This machine specific information includes the speed of the floppy drive and how the speed can be changed for a 3-mode floppy drive, whether the cache is turned on or off and how to turn the cache on or off, and many other machine specific pieces of information; such as Manufacturer assigned serial number (Unique ID) or service tag. Under MS-DOS, a program could simply execute the particular BIOS code to receive and set such machine specific information. However, as operating systems have evolved, more secure multitasking operating systems, such as Microsoft Windows NT™, are designed to prevent direct execution of BIOS code. While direct execution of BIOS code is not desirable to provide a more stable multitasking environment where many programs simultaneously share system resources, the information stored in a system's BIOS is still needed and may still need to be executed from time to time. While Windows NT™ prevents execution of the BIOS, it does allow virtual mode (DOS) and kernel mode device driver program files to read the BIOS information.

BIOS Use Under Windows NT™

Windows NT™ implements its security and protection capabilities by emulating system BIOS, thus preventing BIOS calls by high-level software programs. However, Windows NT™ is not able to emulate all BIOS calls which may be needed by the high-level software. Other ways have been developed to provide machine specific information on a secure operating system such as Windows NT™ without having the operating system actually execute the BIOS code.

One way an operating system program (or driver) can solve this problem is through a large branch table based on the hardware platform. The branch table could give the operating system program knowledge of every machine it is capable of supporting at the time the branch table is developed. A challenge of this method is that the branch table cannot be forward compatible with hardware developed after the branch table has been released.

A second way an operating system program can receive machine specific information is through implementing pseudo-code in the BIOS that the system is capable of interpreting. A pseudo-code approach allows the BIOS to handle requirements based on the requirements declared in the BIOS. A challenge to this approach, however, is that the pseudo-code and its corresponding interpreter must be robust enough to handle future hardware requirements developed after the pseudo-code and interpreter are released.

What is needed is a solution that determines if a computer system was manufactured by a given manufacturer to selectively install software on the computer system.

SUMMARY

To address the above-discussed deficiencies of the prior art, the present invention selectively installs software onto a customer's computer system based upon computer system specific information. The computer specific information is included in one or more configuration files. In a Windows™ environment, the configuration files include a BIOS/DOS memory file. Software to be installed is encrypted and stored on a nonvolatile storage medium that may be a CD-ROM, a floppy disk, a fixed disk, or accessed through a Web Page over the Internet. The configuration file is read to locate computer system specific information and build an encryption key for deciphering the encrypted software. The encrypted software is deciphered and stored on the user's computer system (i.e., on the user's fixed disk drive) where it will be operable by the user. Because many software products include many individual software files, the encryption key is stored in a system registry where it is repeatedly retrieved by a setup program performing the deciphering and installing.

In another embodiment, the invention relates to a method for performing a setup operation on a computer system which includes installing application files onto the computer system. The method includes searching the computer system for manufacturer specific drivers, determining whether specific drivers are present and if the specific driver is present, using the specific driver to access specific machine data, the specific machine data indicating a model time of the computer system, the specific driver providing a key or if the specific driver is not present, spawning a virtual mode application, the virtual mode application accessing a setup application, the setup application accessing a basic input output system (BIOS) of the computer system to provide a disk file, using the disk file to create the key, decrypting the application files using the key, and installing the application files on the computer system.

In another embodiment, the invention relates to a computer system for selectively installing software. The computer system is manufactured by a computer system manufacturer and includes a processor, nonvolatile memory operatively coupled to the processor, a nonvolatile storage device and a system for performing a setup operation on a computer system, the setup operating including installing application files onto the computer system. The includes instructions for searching the computer system for manufacturer specific drivers, determining whether specific drivers are present and if the specific driver is present, using the specific driver to access specific machine data, the specific machine data indicating a model time of the computer system, the specific driver providing a key or if the specific driver is not present, spawning a virtual mode application, the virtual mode application accessing a setup application, the setup application accessing a basic input output system (BIOS) of the computer system to provide a disk file, using the disk file to create the key, decrypting the application files using the key, and installing the application files on the computer system.

A computer system for selectively installing manufacturer provided software includes a processor, memory operatively coupled to the processor, a nonvolatile storage device onto which the software is installed, one or more configuration files, and a computer program executable by the processor that reads a configuration file, determines an encryption key that deciphers software data files, and installs the deciphered software data files onto the nonvolatile storage device.

The foregoing is a summary and thus contains, by necessity, simplifications, generalizations, and omissions of detail. Those skilled in the art will appreciate that the summary is illustrative only an is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

The following is intended to provide a detailed description of an example of the invention and should not be taken to be limiting of the invention itself. Rather, any number of variations may fall within the scope of the invention which is defined in the claims following the description.

Figure 1:
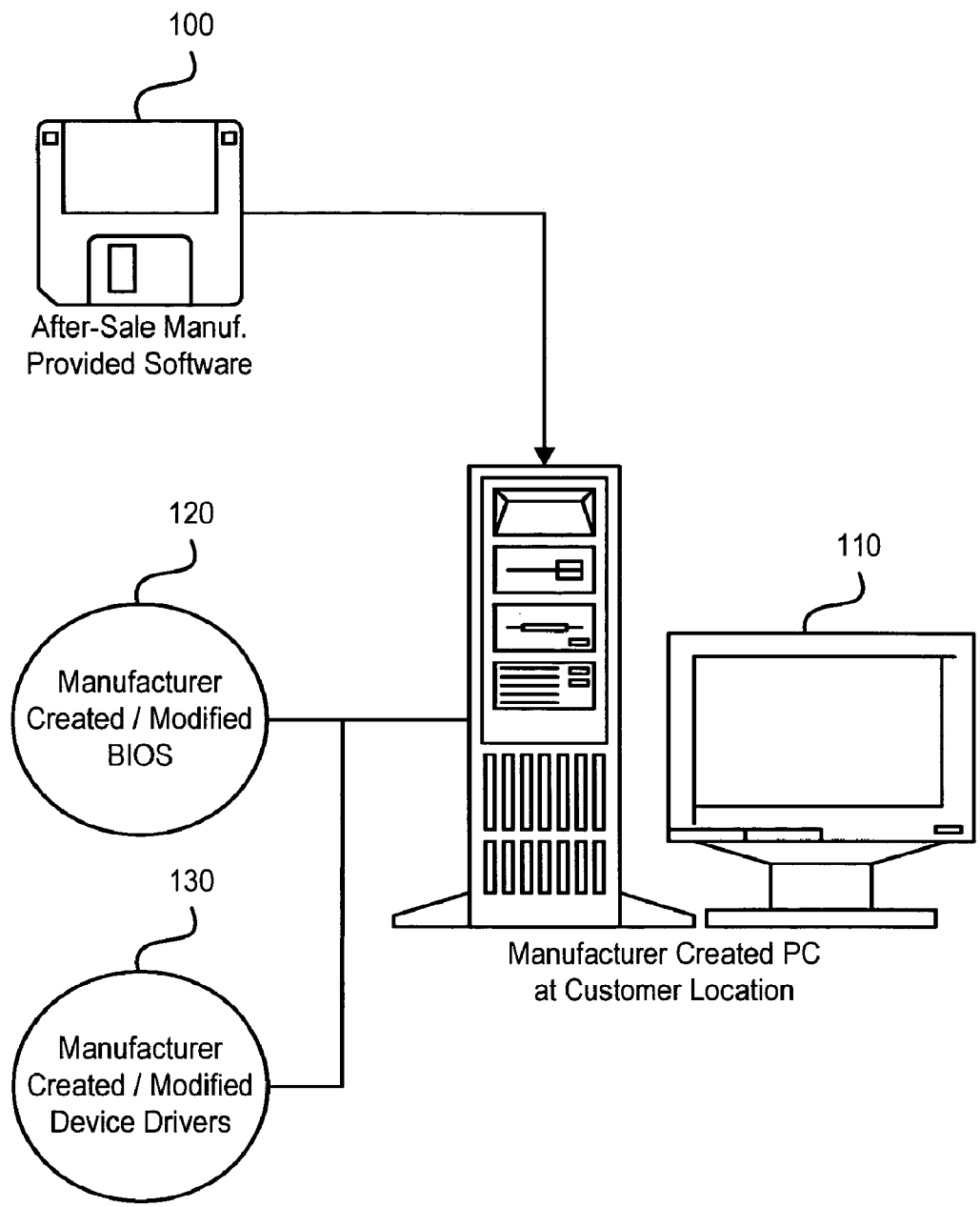
FIG. 1 is a block diagram of a computer system installing software.

FIG. 1 shows removable medium 100 containing software being provided to a customer after the sale of the computer system. While a diskette is shown, those skilled in the art will appreciate that many other forms of media can be used to store the software, including CD-ROMs; JAZ™, ZIP™, Super Disk™, and other high capacity removable storage devices; tape drives; fixed disks; electronic delivery through modems or ISDN devices and the World Wide Web. Removable medium 100 includes nonvolatile storage devices (i.e., fixed disk) as removable medium 100 contains software that is installed by the user after the system is delivered to the user. In some cases, removable medium 100 contains software that is configured by the user after the computer system has been delivered to the user (i.e., software that uses the user's IP address, etc.), and in these cases, removable medium 100 is the fixed disk or other nonvolatile storage device connected to computer system 100. Computer system 110 is the target for the installation of the software contained on removable medium 100. Computer system 110 is shown having BIOS 120 which was created or modified by the manufacturer and manufacturer created or modified device drivers 130.

Figure 2:
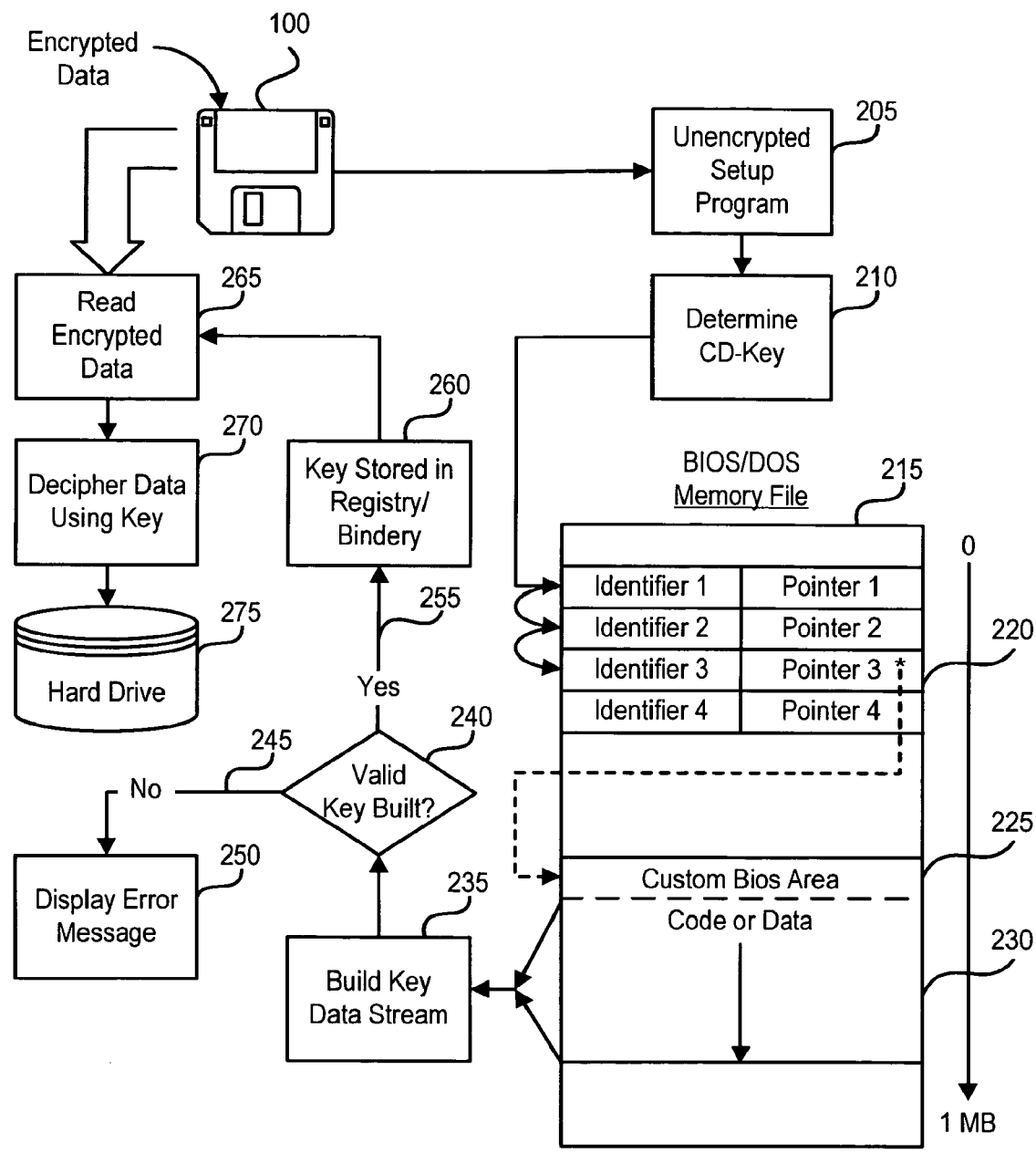
FIG. 2 is a block diagram showing the processing of a BIOS memory file to create a key to read data from a removable medium.

Turning now to FIG. 2, removable medium 100 is shown containing encrypted data and an unencrypted setup program 205. The encrypted data includes software application files and/or other data files being provided to the customer after the sale of a computer system. To ensure that the computer system is indeed a system that was manufactured by the manufacturer, setup program 205 invokes routine 210 to determine the key to use do decrypt the files contained on removable medium 100. Routine 210 processes the BIOS/DOS memory file 215 by reading manufacturer specific identifiers, such as a flag containing the manufacturer's name or manufacturer service tag or processor unique ID. When the identifier is found, pointer 220 contains an address or offset within BIOS/DOS memory file 215 containing customized BIOS area 225 which was customized by the manufacturer. Customized BIOS area 225 contains data or code 230 that is used to build a key data stream at 235. The length of code 230 determines the strength of encryption needed to decrypt the files located on removable medium 100. The longer the key, the more difficult to decipher the encrypted files without determining the key in advance. Various algorithms can be used to process code 230 and piece together the key data stream so that the key is not visible simply by manually reading the BIOS file. In addition, multiple keys can be used to selectively decrypt files on removable medium 100. In this manner, if the BIOS file is processed and it is determined that the computer system is a server, certain files suitable for a server environment may be installable by the setup program, whereas if it is determined that the computer system is a desktop (i.e., non-server) machine than other files may be installable by setup program 205. This facilitates automatic option configuration of installed software which otherwise would have used user input and interaction.

Once a key data stream has been built at 235, decision 240 determines whether the key is valid. The key validity test at decision 240 can be performed in a number of ways, including attempting to decrypt one file on removable medium 100 and processing a return code indicating whether the decryption process was successful. If the key was not built, processing control is passed to branch 245, an error message 250 is passed to setup program 205, and an appropriate error message is displayed to the user at which time execution of setup program 205 terminates. If decision 240 determines that a valid key was built, processing control is passed to branch 255 whereupon the key is optionally stored in the system registry/bindery at 260. The system registry/bindery is used to hold the key so that the setup program does not need to determine the same key repeatedly for each file to be deciphered from removable medium 100. The key is optionally deleted on exit of the setup program 205. When reading encrypted data at 265, the routine will first check whether a key is stored in the system registry/bindery. If no key is found or the key that is found does not work (i.e., an old key left behind), the setup program determines the key by processing the BIOS/DOS file as described above. After the encrypted data is read at 265 it is deciphered at 270 before being installed on hard drive 275.

It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various exemplary modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes. Moreover, alternative embodiments may combine multiple instances of a particular module or submodule. Furthermore, those skilled in the art will recognize that the operations described in exemplary embodiment are for illustration only. Operations may be combined or the functionality of the operations may be distributed in additional operations in accordance with the invention.

Figure 3:
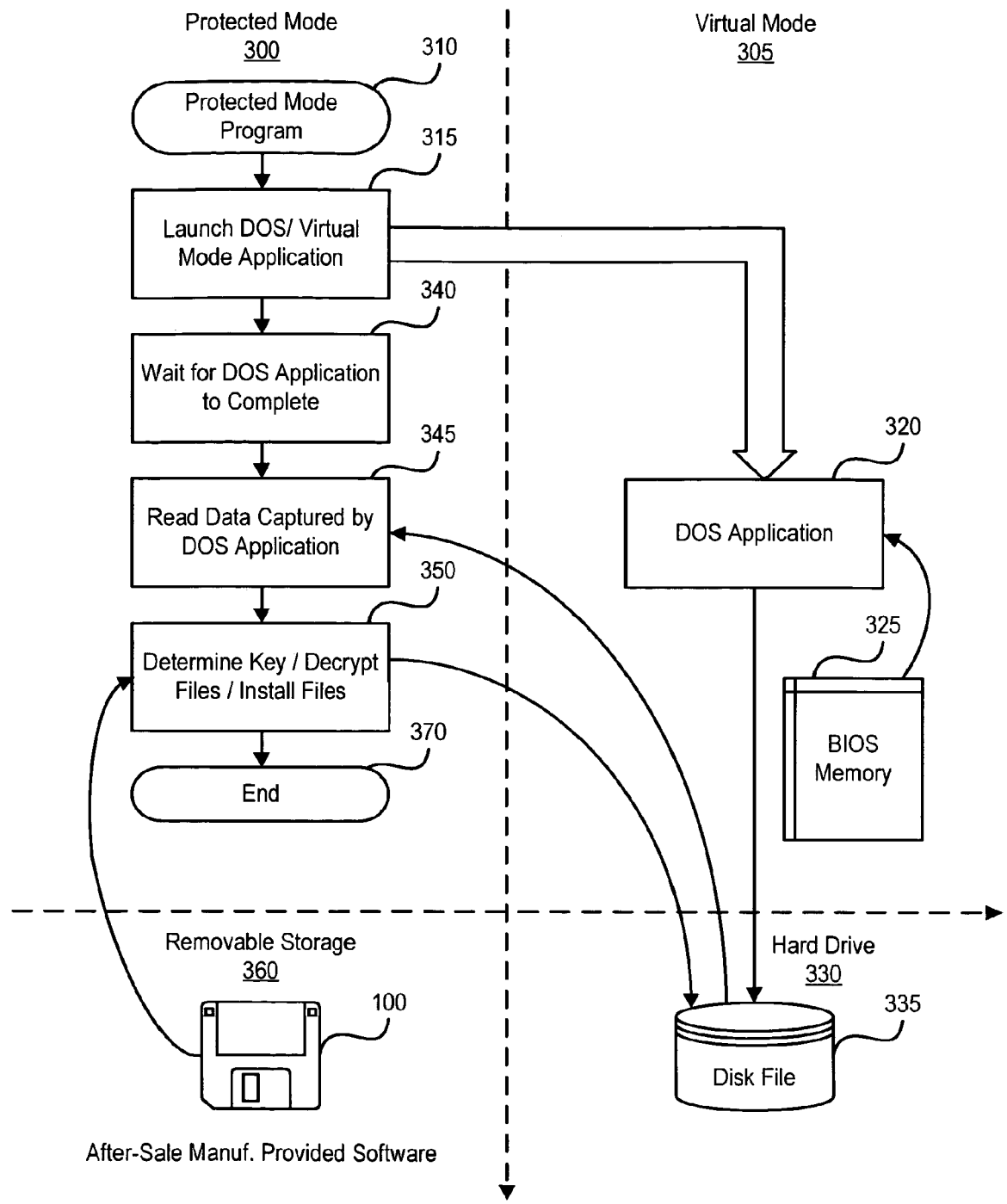
FIG. 3 is a high level flowchart showing the BIOS memory file being read from a protected mode program.

FIG. 3 is a flowchart depicting the processing of the BIOS/DOS file and deciphering of files in a protected mode setup program. Secure operating systems, such as Windows NT™, do not allow the direct reading of BIOS information from a protected mode program. In order to process a BIOS file from a secure operating system, a protected mode program 310 launches a DOS/Virtual Mode application at 315 by spawning a DOS application 320. The DOS/Virtual Mode application is able to read BIOS memory 325 and write the desired information to a disk file 335 located on nonvolatile storage 330 (i.e., a hard drive) attached to the computer system. Protected mode program 310 must wait at 340 for DOS/Virtual Mode application 320 to complete by determining when disk file 335 is available. In order to allow for multiple invocations of protected mode program 310, disk file has a certain name and is erased before the DOS/Virtual Mode application is launched at 315. When disk file 335 is completed, protected mode program 310 stops waiting an reads the data captured by the DOS application at 345. The BIOS/DOS file captured in disk file 335 is processed as described for FIG. 2 above including processing at 350 to determine the key and decrypting and installing the files contained on removable storage 100.

Figure 4:
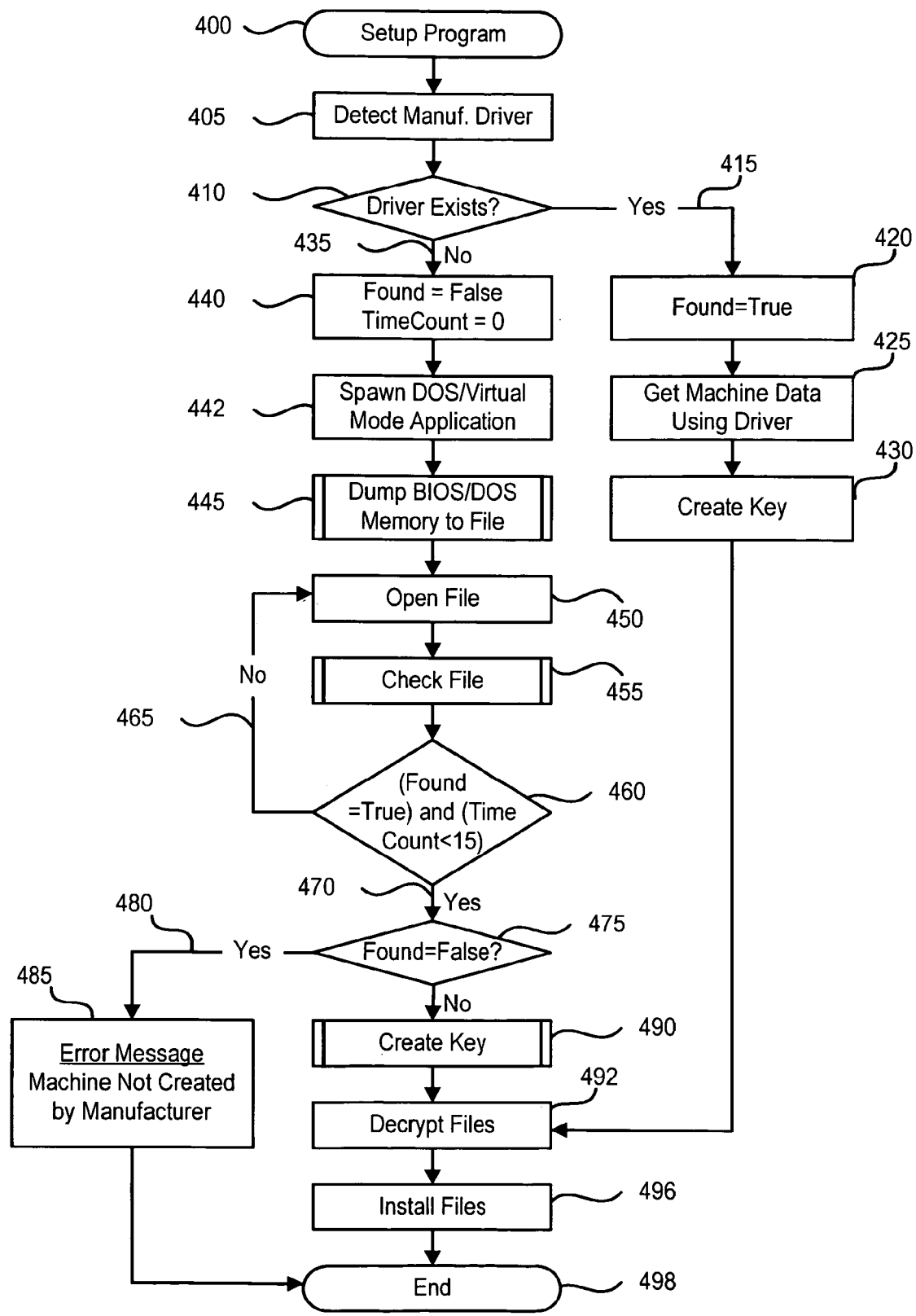
FIG. 4 is a flowchart of a setup program used to selectively install software by determining manufacturer specific characteristics.

FIG. 4 is a flowchart of one example for a setup program 400. Setup program 400 first searches the computer system for manufacturer-specific drivers at 405. If present, certain manufacturer specific device drivers contain or access machine specific data and are used to create a key. Decision 410 determines whether specific drivers are present. If such device drivers are found, process control is directed to "yes" branch 415 where the "Found" flag is set to true at 420. Specific machine data is determined at 425 using the driver. The specific machine data indicates the model type of the computer system and other characteristics, such as whether the computer system is a server and its unique ID. A key is also returned from the driver at 430. In another example, the key may be determined by processing the "no" branch 435 after the "yes" branch 415 is completed. By processing both the "yes" branch 415 and the "no" branch 435, the key value would be determined by the same software and processing the same computer system components. However, if a key can be provided by the device driver at 430, the key may be determined faster as the BIOS/DOS file may not need to be processed to have the key returned at 430.

If the device driver does not exist (or if both branches are to be processed as described above), processing control is passed to "no" branch 435. A flag is set indicating that the key has not been found (Found=False) and a time counter is initialized to zero (TimeCount=0) at 440. DOS/Virtual Mode application 445 is spawned at 442 and dumps the memory contents associated with the BIOS/DOS memory file to a disk file. See FIG. 5 for processing included in routine 445. After DOS/Virtual Mode application routine 445 has been invoked, setup program 400 waits to determine when the BIOS/DOS memory has been dumped to the disk file and the file is available for processing. From a DOS/Virtual Mode based setup program, control would simply return to the calling parent setup program 400 when routine 445 is completed. However, in a multiprocessing secure operating system, such as Windows NT™, the setup program executes in the protected mode of the operating system and DOS/Virtual Mode application 445 is spawned by setup program 400. In a secure operating environment, setup program 400 determines when the spawned DOS/Virtual Mode application 445 is completed by checking for the file being created by routine 445. See FIG. 6 for processing included in routine 455. To check whether the file has been created, setup program 400 attempts to open the file at 450. After this attempt, check file routine 455 determines whether the file exists and sets the Found flag to "True" when the file has been found and is valid. Check file routine 455 also increments counter TimeCount to keep track of how many times routine 455 has checked for the file containing the BIOS/DOS information. After check file routine 455 processes, decision 460 controls a loop by determining whether (1) the Found flag is still "False," and (2) whether the TimeCount counter has exceeded a certain limit (in the example shown the limit is set to 15 iterations). If the Found flag is still "False" and the TimeCount counter is less than the allowed number of iterations, process control is directed to "no" branch 465 which iterates by looping back to open file at 450. On the other hand, if either the Found flag has been set to "True" (i.e., the file was found) or the TimeCount counter exceeds the allowed number of iterations (i.e., timeout error), process control is passed to "yes" branch 470. Along "yes" branch 470, decision 475 determines whether the Found flag has been set to "False." If the Found flag has not been set to "False" (i.e., the file was not found so a timeout error must have occurred) decision 475 directs control to "yes" branch 480 which passes error message 485 to the setup program and an appropriate error message is displayed to the user. Conversely, if the Found flag has been set to "True," the file was found and processing continues by performing create key routine 490. See FIG. 7 for processing included in routine 490. Create key routine 490 determines a key value from the BIOS/DOS file created during the DOS/Virtual Mode application routine 445. If a valid key value cannot be created, routine 490 returns an appropriate return code and setup program 400 displays an error message and terminates before decrypting files at 492. Decrypt files 492 reads files from removable medium 100 and uses the key to decrypt the files before the files are installed on the nonvolatile storage device (i.e., hard drive) at 496. Once the files have been decrypted and installed, setup program 400 terminates at 498.

Figure 5:
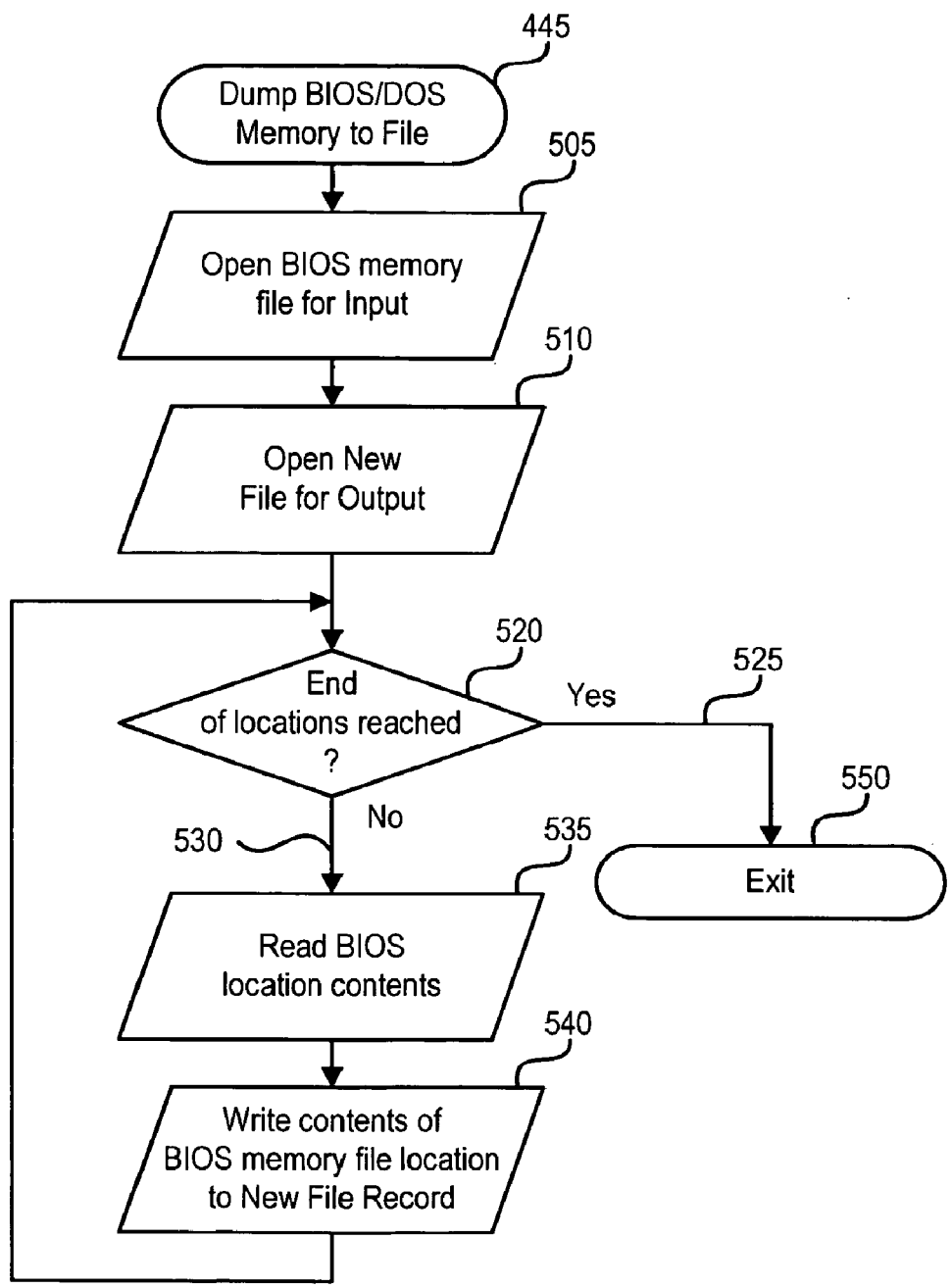
FIG. 5 is a flowchart of a software routine dumping BIOS/DOS memory to a file.

Turning now to FIG. 5, a flowchart is shown of an example for dumping BIOS/DOS memory (i.e., BIOS code) to a disk file referred to as DOS/Virtual Mode application 445. DOS/Virtual Mode application 445 prepares by opening the BIOS memory file for input at 505 and opening a new disk file for output at 510. The new disk file opened for output at 510 has a filename known to setup program 400 which reads the disk file after it has been created. The opening of the new disk file for output should erase any disk file previously created with the same name, but the new disk file can also be erased before the file is opened for output at 510. In memory, the BIOS/DOS file is usually a contiguous piece of physical memory address locations whose contents are copied to the new disk file. The BIOS file is copied location by location until the end of the BIOS/DOS memory locations is reached this check is performed at 520. Read BIOS location contents 535, reads the next required memory BIOS/DOS memory location. The contents of this location is then written to hard disk at the following the write 540. If an end of location has been reached then test 510 will branch to the "yes" branch at 525 and return to the parent setup program at exit 550.

Figure 6:
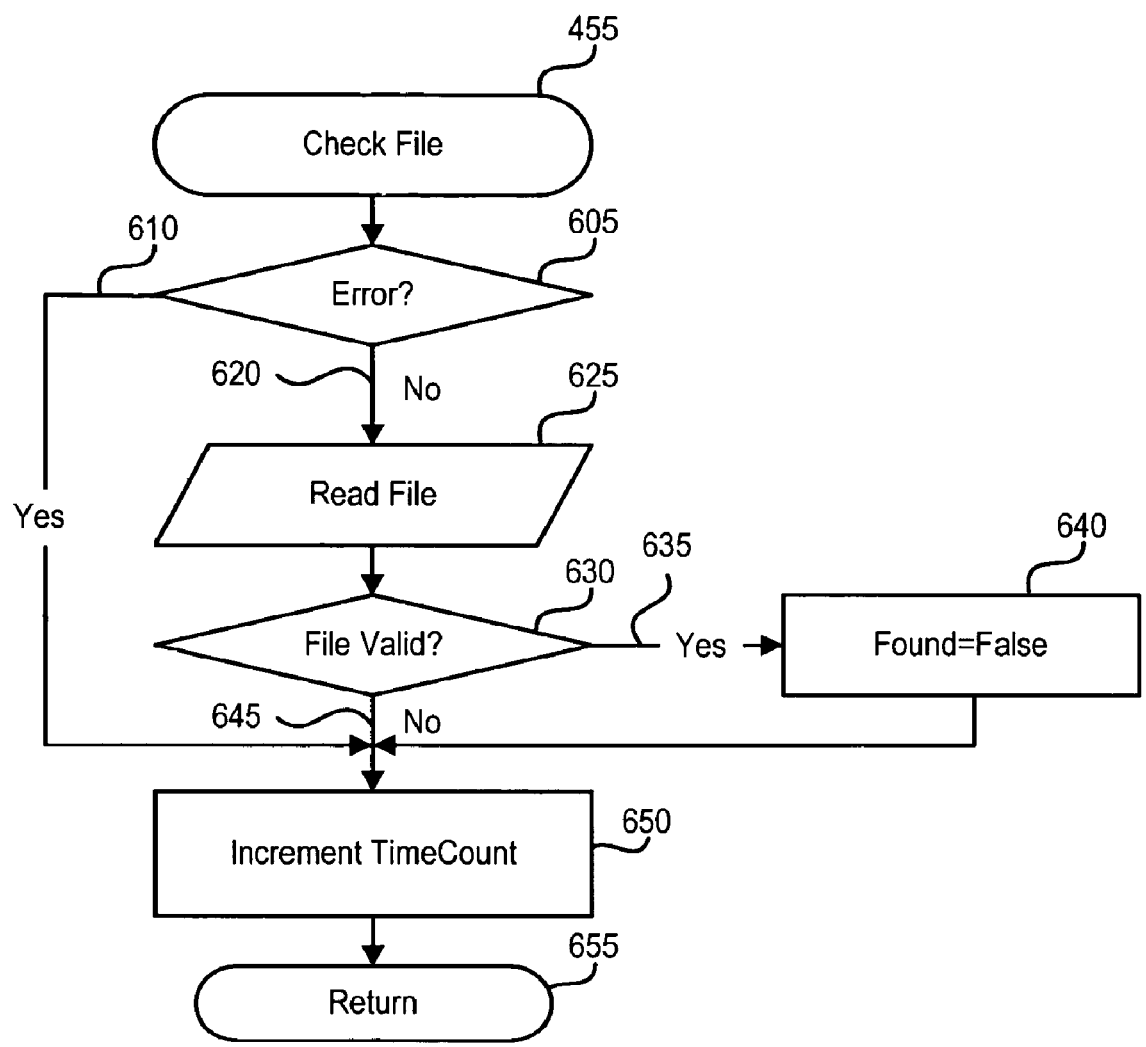
FIG. 6 is a flowchart of a software routine for checking the existence of a file containing the dump of BIOS/DOS memory.

FIG. 6 shows the processing included in check file routine 455 of setup program 400. Check file 455 is invoked after setup program has attempted to open disk file at 450 (See FIG. 4). Decision 605 determines whether an error occurred when setup program 400 attempted to open the disk file. If an error occurred, "yes" branch 610 receives control, whereupon the TimeCount counter is incremented at 650 before returning to setup program 400 at 655. If no error was encountered when setup program 400 attempted to open the disk file, "no" branch 620 receives control. The new disk file is read at 625 to determine if a valid disk file exists (i.e., to ensure that the disk file has been completely written and closed by verifying its contents). Decision 630 determines whether the file read at 625 was a valid disk file. In one example, a Cyclical Redundancy Check (CRC) algorithm is used to verify the contents of the disk file. If the file is determined to be valid, processing continues along "yes" branch 635 whereupon the Found flag is set to "True" indicating that the disk file was found before returning control to setup program 400 at return 655. If the disk file is not determined to be valid, processing continues along "no" branch 645 whereupon the TimeCount counter is incremented before passing control back to setup program 400 at return 655.

Figure 7:
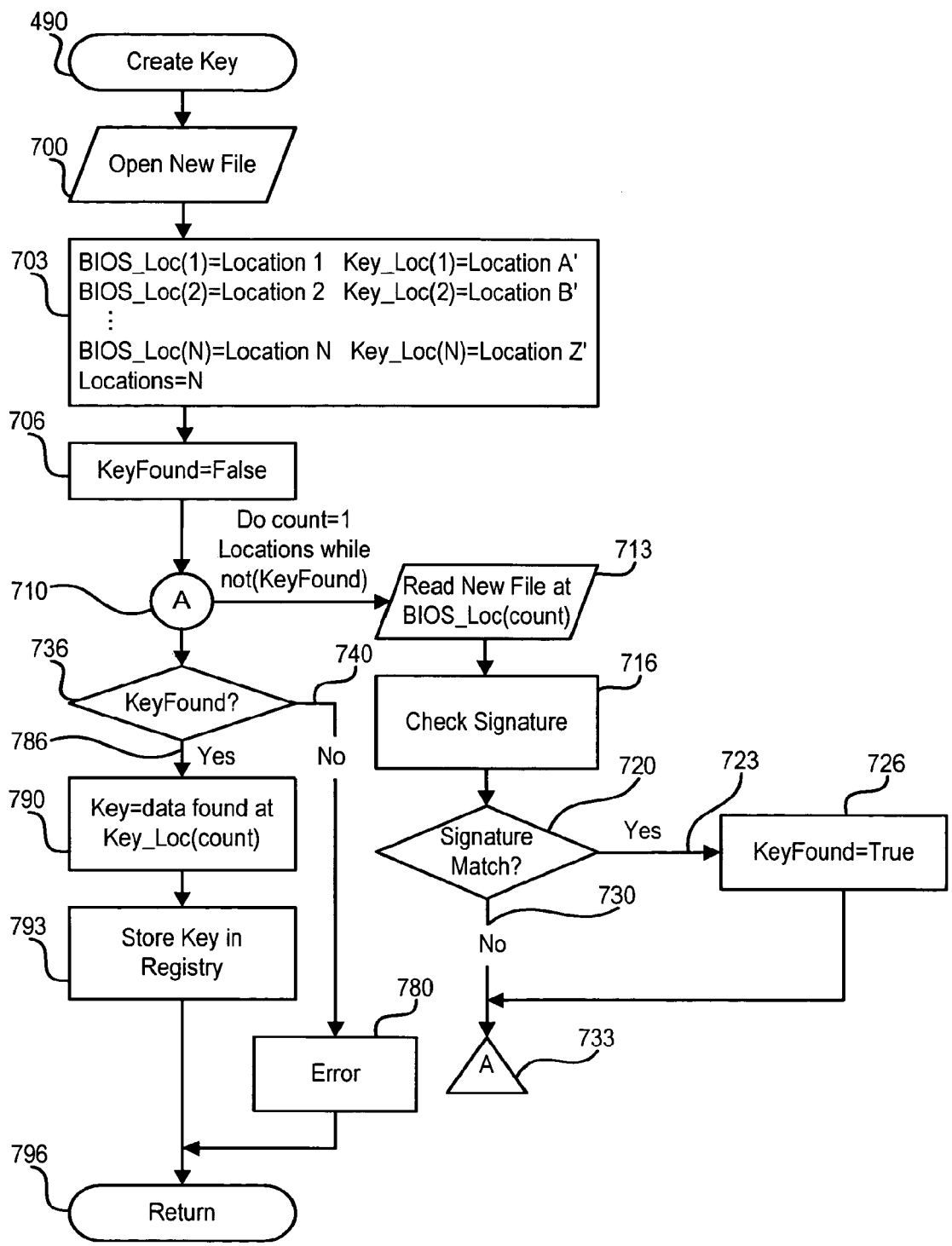
FIG. 7 is a flowchart of a software routine for creating a key used in reading encrypted data files.

FIG. 7 shows the processing included in creating a key during routine 490. Create key routine 490 is called after a disk file containing the BIOS/DOS memory contents was determined to exist at 475 during setup program 400 (see FIG. 4). Create key routine 490 opens the new disk file containing the BIOS code at 700. Pre-existing locations of manufacturer specific data are included in an arrays defined at 703. Arrays defined at 703 contain an N locations each that may contain manufacturer specific information at addresses locations, or offsets, from the beginning of the BIOS/DOS file (location 1, location 2, location N, location A' to Z'). The total number of locations to check for manufacturer specific information is saved as a variable "Locations." In this example, the predetermined locations to check are shown as arrays stored with create key function 490. As will be appreciated by those skilled in the art, other storage techniques may be used to store the locations, including storing the data on removable medium 100 and reading the data into an array during create key routine 490. At 706, a "KeyFound" flag is initialized to "false" indicating that the key has not yet been found. Loop A begins at 710 to process the number of locations stored in array 703 while the key has not been found. During Loop A processing, data is read at 713 from disk file at the location identified by the first location from array BIOS_Loc at 703. Next, the data at the location read from the disk file is processed at 716 to determine if a manufacturer signature is contained in the data read from the disk file. A manufacturer includes manufacturer specific information in the BIOS file to be matched, such as the manufacturer's name or other codes. If the correct signature is found at 720, the "yes" branch 723 is processed and the KeyFound flag is set to "true," which will cause Loop A to terminate. Loop A terminates at 733 whereupon control is iteratively passed back to the beginning of Loop A at 710. It will be appreciated by those skilled in the art that the example described above is but one way of searching a file for manufacturer specific information. Another way of searching the BIOS/DOS file would be to sequentially search the BIOS/DOS file for the manufacturer specific information in addition to or in lieu of searching predetermined locations defined by array 703.

After Loop A terminates, either by processing all the locations in array 703 or when the KeyFound flag is set to True, processing continues to decision 736 which determines whether a manufacturer signature was found during Loop A processing of the locations identified in array 703. If the KeyFound flag is still false (i.e., a manufacturer signature was not found), control passes to "no" branch 740 for marking an error condition and exiting. An error is reported at 780, indicating that the computer system does not contain manufacturer's signature and is therefore not a manufacturer created computer system, before returning to setup program for processing.

If the manufacturer's signature was found at either decision 736 or decision 773, a "yes" branch 786 or 783, respectively, is followed and the decryption key is determined at 790. In one example, the key comprises data found at the location marked by an array defined at 703. In other example the key is located where the manufacturer's signature was found. In another example, the key is comprised of various components found in the BIOS file. In still another example, the data found in the BIOS/DOS file at locations determined by the manufacturer's signature are processed through an algorithm to determine a key value to create a key not visible in the BIOS/DOS file. After the key value for decrypting the files on removable medium 100 has been determined at 790, the key is stored in the system registry/bindery (i.e., the Windows 95™ system registry, the Windows NT™ system registry, the Netware Bindery, etc.) so that the key can be repetitively retrieved and used to decrypt files on removable medium 100 without the need of performing the create key routine 490 for each encrypted file. Once the key is no longer needed to decipher files, it is removed from the registry before termination of setup program 400.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that if a specific number of an introduced claim element is intended, such an intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use of definite articles.

What is claimed is:

1. A method for performing a setup operation on a computer system, the setup operating including installing application files onto the computer system, the method comprising:
   searching the computer system for manufacturer specific drivers;
   determining whether specific drivers are present,
   if the specific driver is present, using the specific driver to access specific machine data, the specific machine data indicating a model type of the computer system, the specific driver providing a key;
   if the specific driver is not present, spawning a virtual mode application, the virtual mode application accessing a setup application, the setup application accessing a basic input output system (BIOS) of the computer system to provide a disk file;
   using the disk file to create the key;
   decrypting the application files using the key; and,
   installing the application files on the computer system.

2. The method, as recited in claim 1, wherein
the virtual mode application dumps contents of the BIOS to the disk file.

3. The method, as recited in claim 2, wherein
dumping the contents of the BIOS to the disk file further comprises
opening memory in the BIOS for input;
opening a disk file for output
copying contents of the memory in the BIOS to the disk file location by location until the end of the BIOS has been reached.

4. The method, as recited in claim 1, wherein
the virtual mode application checks the disk file.

5. The method, as recited in claim 1, wherein
checking the disk file comprises
opening the disk file
determining whether the disk file is a valid disk file;
based upon the determining, indicating that the disk file is a valid disk file.

6. The method, as recited in claim 5, wherein
the determining whether the disk file is a valid disk file is via a cyclical redundancy check (CRC) operation.

7. The method, as recited in claim 1, wherein
the virtual mode application creates the key based upon the disk file.

8. The method, as recited in claim 1, wherein
using the disk file to create the key further comprises
opening the disk file
accessing preexisting locations within the disk file to obtain of manufacturer specific data;
reading the manufacturer specific data;
using the manufacturer specific data to create the key.

9. The method, as recited in claim 8, wherein
the manufacturer specific data is arranged in an array within the disk file; and,
the accessing accesses the array.

10. A computer system for selectively installing software, the computer system being manufactured by a computer system manufacturer, the computer system comprising:
  a processor;
  nonvolatile memory operatively coupled to the processor;
  a nonvolatile storage device;
  a system for performing a setup operation on a computer system, the setup operating including installing application files onto the computer system, the system comprising instructions for:
    searching the computer system for manufacturer specific drivers;
    determining whether specific drivers are present,
    if the specific driver is present, using the specific driver to access specific machine data, the specific machine data indicating a model type of the computer system, the specific driver providing a key;
    if the specific driver is not present, spawning a virtual mode application, the virtual mode application accessing a setup application, the setup application accessing a basic input output system (BIOS) of the computer system to provide a disk file;
    using the disk file to create the key;
    decrypting the application files using the key; and,
    installing the application files on the computer system.

11. The computer system, as recited in claim 10, wherein the virtual mode application dumps contents of the BIOS to the disk file.

12. The computer system, as recited in claim 11, wherein dumping the contents of the BIOS to the disk file further comprises
  opening memory in the BIOS for input;
  opening a disk file for output
  copying contents of the memory in the BIOS to the disk file location by location until the end of the BIOS has been reached.

13. The computer system, as recited in claim 10, wherein the virtual mode application checks the disk file.

14. The computer system, as recited in claim 10, wherein checking the disk file comprises
  opening the disk file
  determining whether the disk file is a valid disk file;
  based upon the determining, indicating that the disk file is a valid disk file.

15. The computer system, as recited in claim 14, wherein the determining whether the disk file is a valid disk file is via a cyclical redundancy check (CRC) operation.

16. The computer system, as recited in claim 10, wherein the virtual mode application creates the key based upon the disk file.

17. The computer system, as recited in claim 10, wherein using the disk file to create the key further comprises
  opening the disk file
  accessing preexisting locations within the disk file to obtain of manufacturer specific data;
  reading the manufacturer specific data;
  using the manufacturer specific data to create the key.

18. The computer system, as recited in claim 17, wherein the manufacturer specific data is arranged in an array within the disk file; and,
  the accessing accesses the array.

* * * * *